(12) United States Patent
Desai et al.

(10) Patent No.: US 8,200,189 B2
(45) Date of Patent: Jun. 12, 2012

(54) VOICE PORTAL TO VOICE PORTAL VOIP TRANSFER

(75) Inventors: Prashant Desai, Land O Lakes, FL (US); Juan Vasquez, Gibsonton, FL (US); Mayuresh Mohan Hegde, Irving, TX (US); Parind Poi, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1028 days.

(21) Appl. No.: 12/142,237

(22) Filed: Jun. 19, 2008

(65) Prior Publication Data

US 2009/0318111 A1 Dec. 24, 2009

(51) Int. Cl.
*H04M 11/00* (2006.01)

(52) U.S. Cl. ........ 455/406; 455/410; 455/411; 455/415; 455/428; 379/207.14; 379/207.15; 379/211.02; 379/212.01

(58) Field of Classification Search .................. 455/406, 455/412.1–414.2, 432.1, 435.1; 370/400–401, 370/352–358; 379/207.14–212.01
See application file for complete search history.

(56) References Cited

U.S. PATENT DOCUMENTS

2006/0109837 A1* 5/2006 Saha et al. .................... 370/352

\* cited by examiner

*Primary Examiner* — Dai A Phuong

(57) ABSTRACT

A method includes receiving at a voice portal a telephone call from a caller and acquiring from the caller a billing telephone number. The method also includes determining, based on the billing telephone number, that the telephone call should be transferred to a specific call center; identifying an exchange number for the specific call center; assembling a refer message based on the billing telephone number and the exchange number of the specific call center; and sending the refer message to a network device.

17 Claims, 7 Drawing Sheets

VOICE PORTAL TO VOICE PORTAL VOIP TRANSFER

BACKGROUND

Voice portals are frequently used to answer calls and obtain information from callers. For example, businesses often use voice portals that include interactive voice response (IVR) units to interact with callers and to obtain information from the callers. A voice portal may attempt to resolve a caller's inquiry or request without human intervention. Business may have separate voice portals for different categories of assistance (e.g., billing, ordering, repairs, marketing, etc.). Frequently, the voice portal obtains information and determines that a caller's inquiry should be addressed by a different voice portal.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention. Instead, the scope of the invention is defined by the appended claims and their equivalents.

Implementations described herein relate to transferring calls and certain data associated with a call. In one implementation, a call may be transferred from a first voice portal to another voice portal using voice over Internet protocol (VoIP) based signaling. In another implementation, data provided by a caller may be forwarded with the call to the appropriate voice portal.

Figure 1:
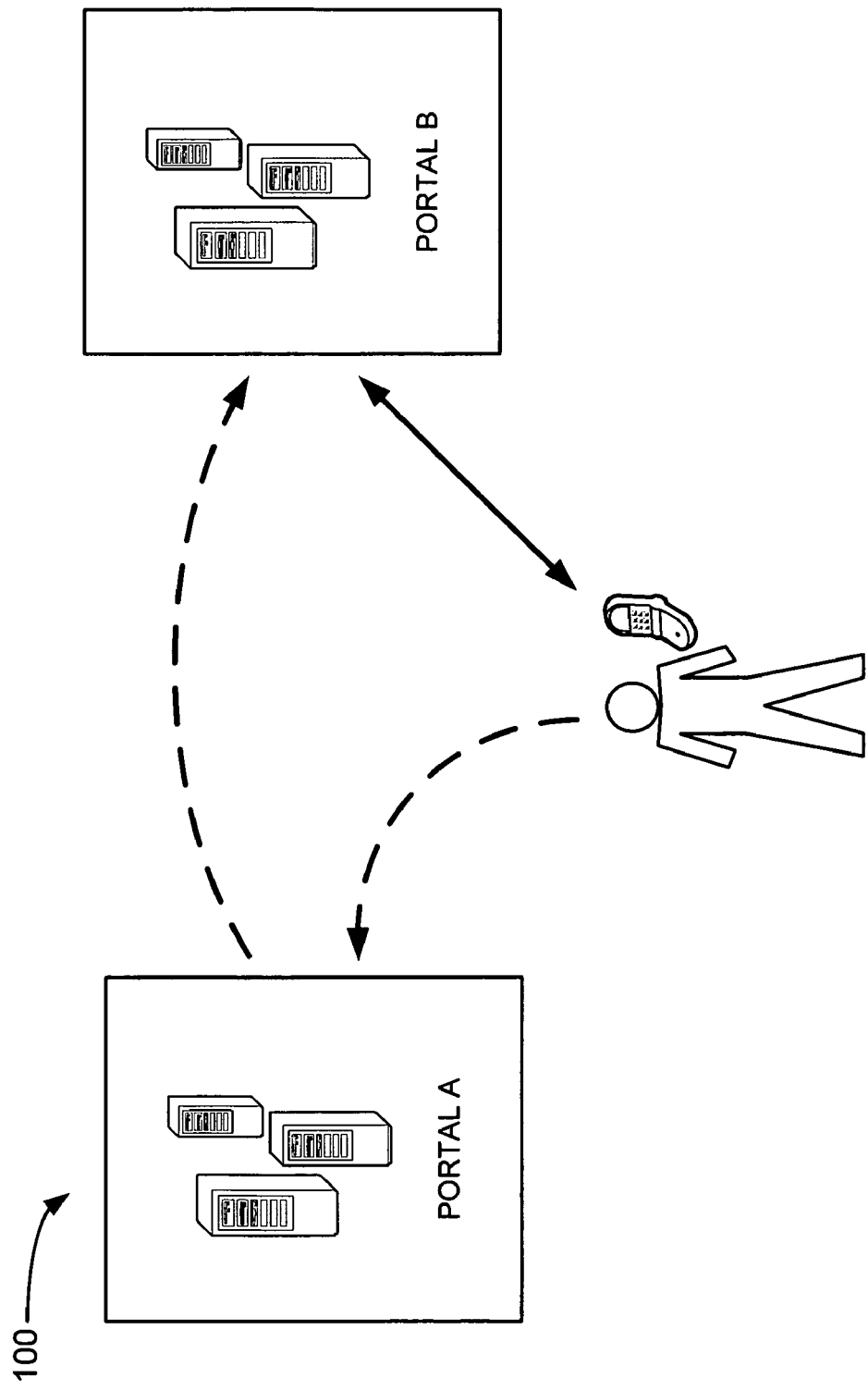
FIG. 1 is a schematic diagram illustrating an implementation of the systems and methods described herein.

Seamless transfer of caller data between voice portals may be desirable to avoid requiring a caller to repeat information. Existing transfer mechanisms across disparate telephony networks require third-party tools for integration and passing of the data. Implementations described herein provide transfer of a call with caller data that does not require third-party tools. For example, referring to FIG. 1, a caller may place a call from a business-owned cellular phone seeking information about a personal account. Using caller identification technology, the call may be automatically directed to a voice portal for business accounts (portal A). The voice portal for business accounts may detect the caller speaking/entering a residential billing telephone number (BTN) and may recognize that the call should be transferred to a residential services voice portal (portal B). Implementations of systems and methods described herein may enable the transfer of the call and the caller's intended BTN from one voice portal (portal A) to the other voice portal (portal B) without the need for third-party integration tools.

Figure 2:
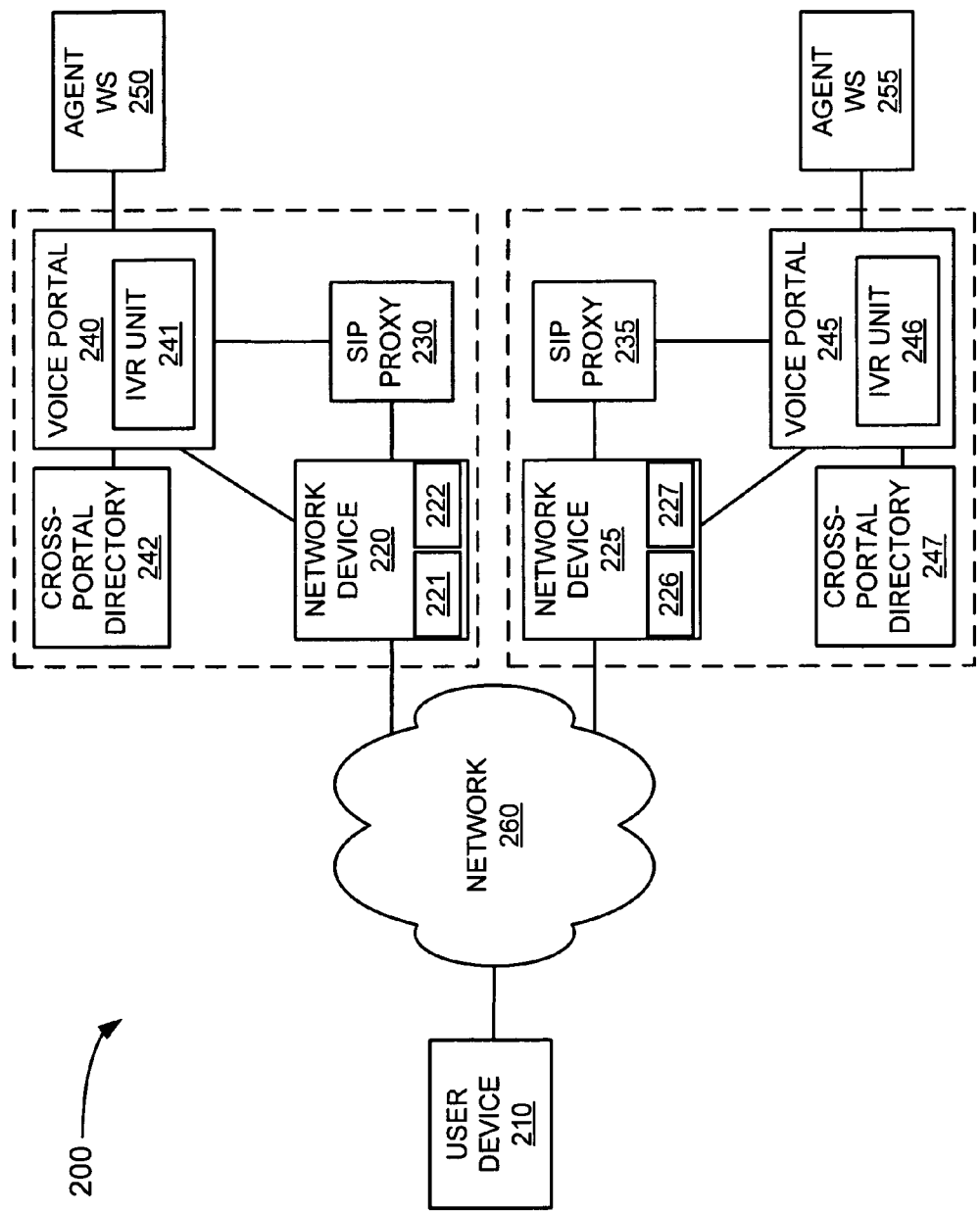
FIG. 2 illustrates an exemplary network in which systems and methods described herein may be implemented.

FIG. 2 is a block diagram of an exemplary network 200 in which systems and methods described herein may be implemented. As illustrated, network 200 may include a user device 210, network devices 220 and 225, session initiation protocol (SIP) proxies 230 and 235, voice portals 240 and 245, cross-portal directories 242 and 247, and agent workstations (WS) 250 and 255, interconnected by a network 260. Components of network 200 may interconnect via wired and/or wireless connections. The exemplary configuration illustrated in FIG. 2 is provided for simplicity. It should be understood that a typical network may include more or fewer devices than illustrated in FIG. 2. For example, additional user devices, network devices, SIP proxies, etc., involved in routing calls and data may be included in network 200. In addition, additional voice portals and agent WSs may be included in network 200.

User device 210 may include any type of communication or computation device that is capable of transmitting and receiving voice signals and/or data to/from a network, such as network 260. For example, user device 210 may include any standard telephone, cordless telephone, cellular telephone, or other type of conventional telephone that interfaces with a public switched telephone network (PSTN) and/or wireless network to place and receive telephone calls. User device 210 may also include any client, such as a computer device, a web-based appliance, etc., that is configured to provide telephone functions using, for example, voice over Internet protocol (VoIP). For example, user device 210 may include a session initiation protocol (SIP)-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional personal computer (PC), laptop computer or other computing device.

Network device 220 may include, for example, a gateway 221 and a session border controller (SBC) 222. Similarly, network device 225 may include a gateway 226 and a session border controller (SBC) 227. Each gateway 221/226 may include one or more devices that allow divergent transport networks to communicate and cooperatively carry traffic. For example, gateways 221 and 226 may enable interoperation at two levels, e.g., between different signaling schemes and between different media forms. For example, gateways 221 and 226 may adapt between signaling system 7 (SS7) signaling of network 260 and session initiation protocol (SIP), H.323 protocols or other protocols (e.g., Internet protocols (IPs) or Internet-based protocols) used by other devices in network 200. In one implementation, gateways 221 and 226 may convert time division multiplexed (TDM) encoded voice signals to a packetized data stream suitable for transport to and processing by a respective SIP proxy 230, 235.

Each session border controller (SBC) 222, 227 may include one or more SBCs that provide control of a boundary between different service provider networks, provide signaling protocol inter-working between an IP-based network and other service provider networks, control a transport boundary between service provider networks, and provide usage metering and Quality of Service (QoS) measurements for media flows. In one implementation, SBCs 222 and 227 may provide an ingress point to respective SIP proxy 230/235. For example, SBC 222 may receive a VoIP call from user device 210 and may forward the VoIP call to SIP proxy 230.

Each SIP proxy 230/235 may include a server/computing device that may receive data from their respective network devices 220, 225 and may forward the received data to an appropriate voice portal, such as one of voice portals 240 and 245, using SIP protocol. In other implementations, each SIP proxy 230/235 may receive and forward data via another protocol, such as H.323. While a single voice portal is shown with each SIP proxy for simplicity, in other implementations, multiple voice portals may be associated with each SIP proxy. Thus, in an exemplary implementation, each SIP proxy 230/235 may also balance a load associated with a large number of calls among a number of voice portals.

Voice portal 240 may represent a front end device associated with a call center. In an exemplary implementation, voice portal 240 may include an interactive voice response (IVR) unit 241 that interacts with callers to obtain information associated with the call. For example, IVR unit 241 may include speech software/hardware that provides voice commands to a caller to obtain information. IVR unit 241 may also include speech recognition software that receives voice responses from a caller and identifies what the caller's voice response is. If necessary (e.g., the call cannot be handled without human intervention), voice portal 240 may forward the call to an appropriate agent WS, such as agent WS 250. Voice portal 240 may also include an automatic call distributor (ACD) or interface with an ACD (not shown) that distributes calls among a number of agent workstations, such as agent WS 250 and other agent WSs (not shown).

Voice portal 245 may include IVR unit 246 and may represent a front end associated with a different call center than voice portal 240. Voice portal 245 and IVR unit 246 may be structurally similar to voice portal 240 and IVR unit 241, but have access to different information. For example, voice portal 240 may represent the front end of a call center associated with mobile telephone networks, such as billing, ordering new service plan, or service inquiries; while voice portal 245 may represent the front end of a call center associated with wired telephone and/or data services, such as telephone, television and/or Internet services, etc. Voice portal 245 may also include an ACD or interface with an ACD (not shown) that distributes calls among a number of agent workstations, such as agent WS 255 and other agent WSs (not shown).

Agent WSs 250 and 255 may include any conventional workstation/computer and operator used to handle calls from callers that require human intervention. In an exemplary implementation, agent WS 250 may be associated with voice portal 240 and agent WS 255 may be associated with voice portal 245. In addition, in an exemplary implementation, agent WSs 250 and 255 may be connected to voice portals 240 and 245 (respectively) via a network, such as network 260. In alternative implementations, agent WSs 250 and 255 may be connected directly to the voice portals, connected via a LAN, connected via a private network, etc.

Cross-portal directories 242 and 247 may provide respective voice portals 240 and 245 with access to a calling party's account information, such as a type of account associated with a BTN. Cross-portal directories 242 and 247 may be, for example, a database. Each voice portal 240/245 may look up a party's account information in cross-portal directories 242 and 247, respectively, based on the party's BTN or other identifying data, and determine the correct voice portal. Cross-portal directories 242 and 247 may also provide the exchange number of the correct voice portal. In another implementation, voice portals 240 and 245 may be provided with access to one or more centrally located cross-portal lookup directories in place of respective cross-portal directories. The centrally located directories may, for example, be accessed by voice portals 240 and 245 via a network, such as network 260. In still another implementation, one or more cross-portal directories, separate from cross-portal directories that may be used to provide a party's account information, may be used to provide the exchange number for the correct voice portal.

Network 260 may include one or more wired and/or wireless networks that are capable of receiving and transmitting data and voice signals. For example, network 260 may include one or more public switched telephone networks (PSTNs) or other type of switched network. Network 260 may also include one or more wireless networks and may include a number of transmission towers for receiving wireless signals and forwarding the wireless signals toward the intended destination. Network 260 may further include one or more packet switched networks, such as an Internet protocol (IP) based network, a local area network (LAN), a wide area network (WAN), an intranet, the Internet, or another type of network that is capable of transmitting telecommunications traffic (e.g., VoIP traffic). For example, network 260 may include one or more SIP-based networks, one or more H.323/H.225-based networks, or any other type of packet switched network that is capable of transmitting traffic from a source device to a destination device.

In one implementation, the components illustrated within the dotted boxes in FIG. 2 (i.e., network device 220, SIP proxy 230, and voice portal 240 and network device 225, SIP proxy 235, and voice portal 245) may be located within the same data center. Various functions are described below as being performed by particular components in network 200. In other implementations, various functions described as being performed by one device may be performed by another device or various functions described as being performed by multiple devices may be combined and performed by a single device.

Figure 3:
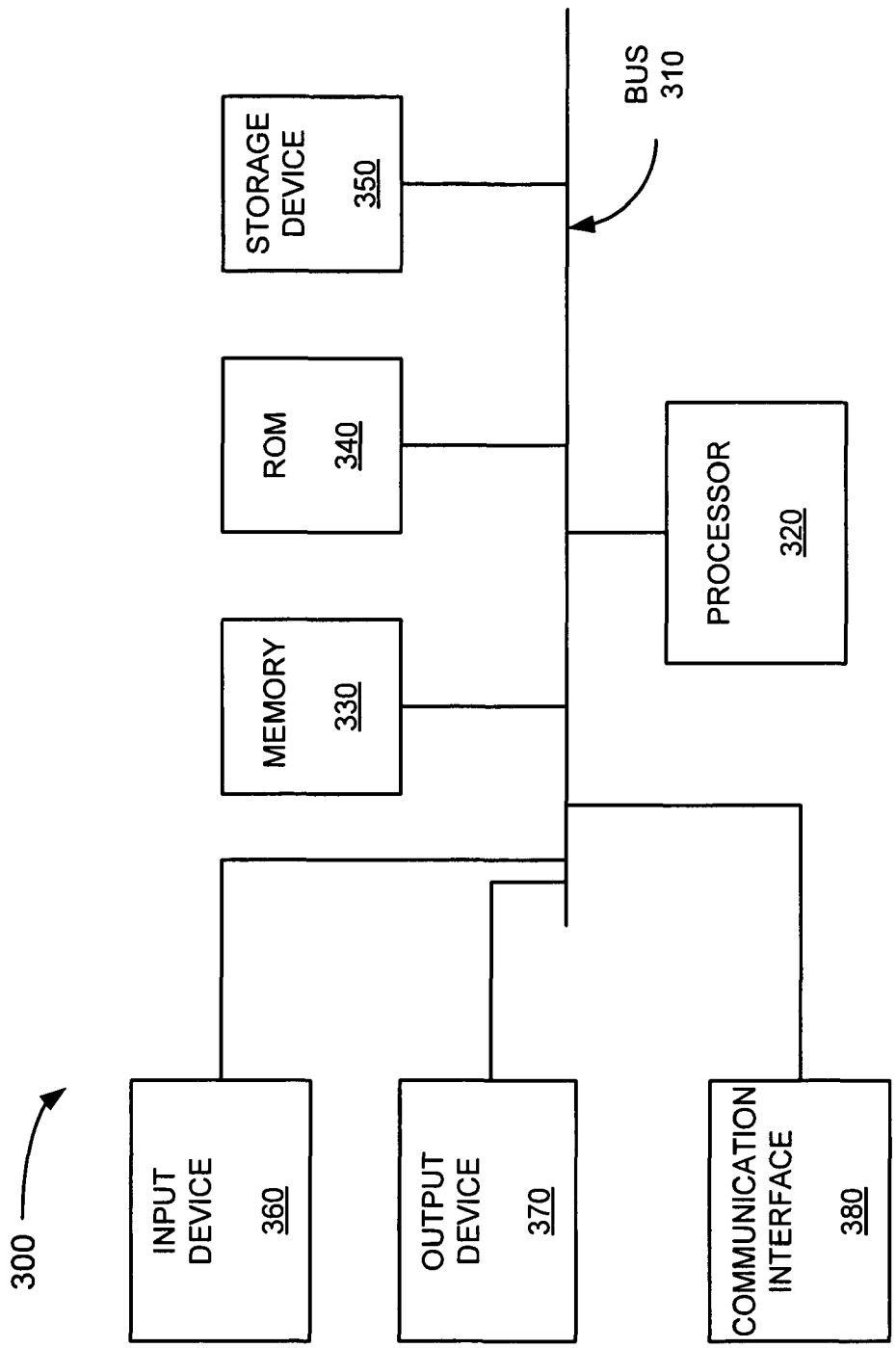
FIG. 3 depicts an exemplary configuration of particular components in the network of FIG. 2.

FIG. 3 is an exemplary configuration of a device 300 that may correspond to any of gateways 221/226; SBCs 222/227; SIP proxies 230/235; and/or voice portals 240/245. Referring to FIG. 3, device 300 may include a bus 310, a processor 320, main memory 330, read only memory (ROM) 340, a storage device 350, an input device 360, an output device 370, and a communication interface 380. Bus 310 may include a path that permits communication among the elements of device 300.

Processor 320 may include a processor, microprocessor, or processing logic that may interpret and execute instructions. Memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to device 300, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that device 300 may use to communicate with other devices and/or systems. For example, communication interface 380 may include a modem or an Ethernet interface to a LAN. Alternatively, communication interface 380 may include other mechanisms for communicating via a network, such as network 260.

Device 300 may perform processing associated with processing calls and/or data in network 200. According to an exemplary implementation, device 300 may perform these operations in response to processor 320 executing sequences of instructions contained in a computer-readable medium, such as memory 330. A computer-readable medium may be defined as a physical or logical memory device.

The software instructions may be read into memory 330 from another computer-readable medium, such as data storage device 350, or from another device via communication interface 380. The software instructions contained in memory 330 may cause processor 320 to perform processes that will be described later. Alternatively, hard-wired circuitry may be used in place of or in combination with software instructions to implement processes consistent with the principles of the invention. Thus, implementations described herein are not limited to any specific combination of hardware circuitry and software.

Figure 4:
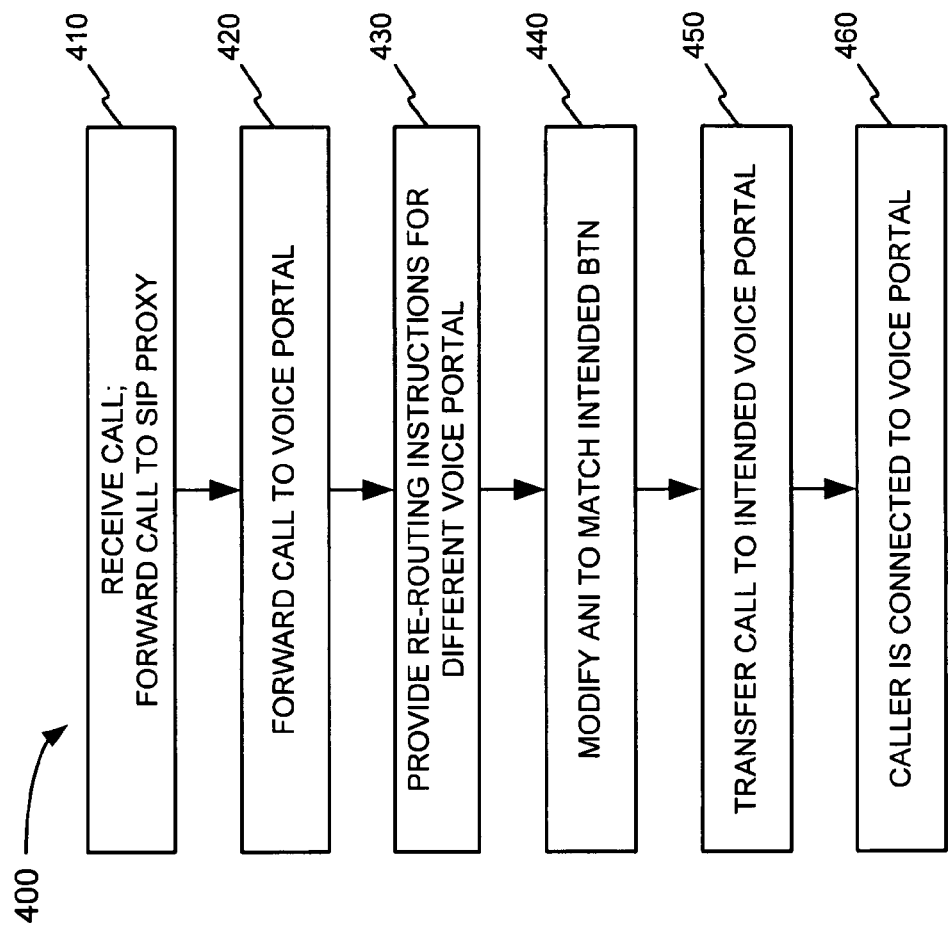
FIG. 4 is a flow diagram illustrating exemplary processing by components of the network of FIG. 2.

FIG. 4 is a flow diagram illustrating an exemplary process 400 associated with processing calls in network 200. In one implementation, process 400 may be performed by network device 220. In another implementation, some or all of process 400 may be performed by another device or group of devices, including or excluding network device 220. Processing may begin when a caller at user device 210 places a call to one of voice portals 240 or 245. For example, assume that user device 210 is a conventional plain old telephone system (POTS) phone and the caller enters a telephone number associated with voice portal 240 via user device 210. The call may be routed via network 260 to network device 220.

The call may be received and it may be determined that the call is intended for a voice portal (e.g., voice portal 240) (block 410). The incoming call may also be converted into an IP format and forwarded to a SIP proxy (e.g., SIP proxy 230) (block 410). For example, network device 220 may receive the call via a digital signal "0" (DS0) channel in a TDM format and may convert the incoming call into a packet based format, such as a SIP format, for processing by SIP proxy 230.

SIP proxy 230, as discussed above, may perform load balancing among a number of voice portals. For example, SIP proxy 230 may use a dialed number identification service (DNIS) to identify the telephone number that the caller at user device 210 dialed. In one example, the identified telephone number may be a number associated with a voice portal that handles retail related telephone/television/Internet issues. In addition, a number of voice portals may be configured to handle such calls/issues. In this case, SIP proxy 230 may determine that the call is to be forwarded to voice portal 240 based on the current call processing load of voice portal 240 and other voice portals (not shown) that handle retail related issues. The call may be routed (e.g., by SIP proxy 230) to voice portal 240 (block 420).

Upon determining that the caller needs different assistance, re-routing instructions for a different voice portal may be provided (block 430). More details of how re-routing instructions may be provided are described below in connection with FIG. 5.

Figure 5:
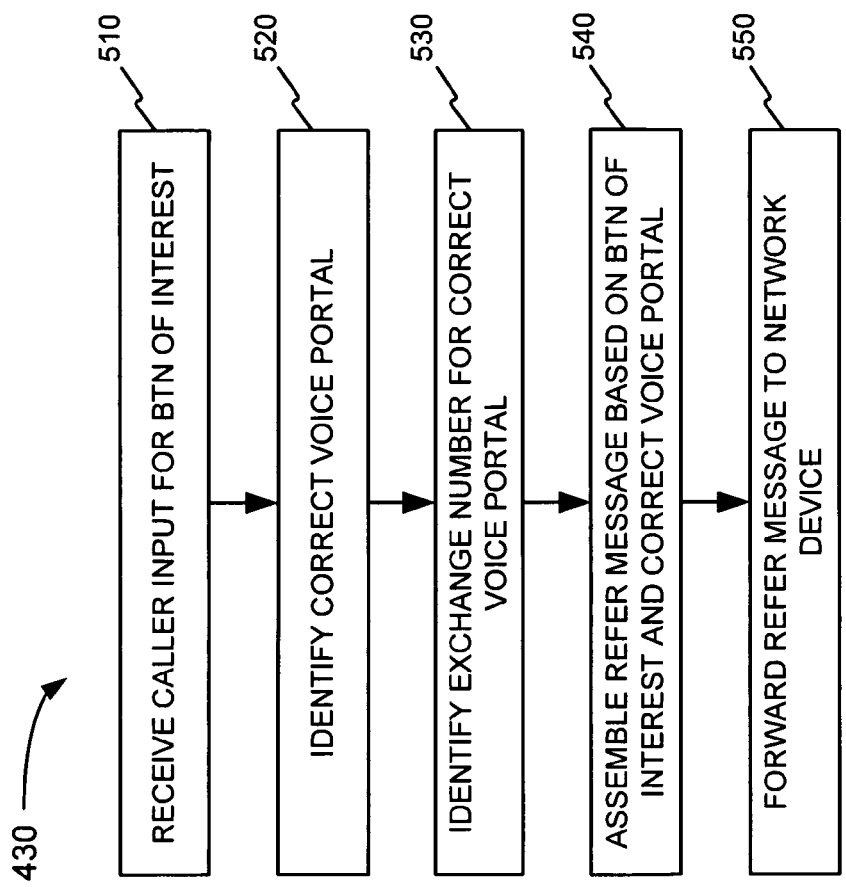
FIG. 5 is a flow diagram illustrating exemplary processing for providing re-routing instructions depicted in FIG. 4.

Referring to FIG. 5, a caller input for a BTN of interest may be received (block 510). For example, IVR unit 241 at voice portal 240 may answer the call to establish communications with the caller at user device 210. IVR unit 241 may interact with the caller to determine how to assist the caller. For example, as discussed above, voice portal 240 may be associated with the front end of a call center designed to handle retail-related issues (such as billing related issues, ordering new features/service, etc.) for fiber optic telephone services.

After interacting with the caller, IVR unit 241 may determine that the caller at user device 210 is interested in a BTN that is not associated with fiber optic telephone services. This determination may be made, for example, by the IVR unit 241 querying whether the caller's number—the automatic number identification (ANI)—is the BTN of interest, the caller responding by indicating it is not, and the caller subsequently speaking and/or entering a BTN that is not listed in a directory of numbers associated with fiber optic telephone services. For example, the caller may speak/enter a mobile telephone number (MTN) for the account of interest to the caller. In another implementation, the caller may confirm that the number called from is the BTN of interest, but the BTN may still not be listed in a directory of numbers associated with fiber optic telephone services.

The correct voice portal may be identified (block 520). For example, there may be within a corporate structure a variety of non-integrated voice portals associated with different BTNs. For example, separate voice portals may exist for different network infrastructures (e.g., copper wire, fiber optics, wireless, etc.) and different service types (existing customer sales, repairs, customer relations, etc.). In one implementation, each voice portal (e.g., voice portals 240, 245) may be provided with a cross-portal lookup directory (e.g., cross portal directories 242, 247). In another implementation, each voice portal may be provided with access to a centrally located cross-portal directory. Continuing with the example from block 510, assume that voice portal 245 is associated with handling services for mobile communications. Thus, voice portal 240 may use the cross-portal directory to identify the caller-provided BTN as a MTN.

An exchange number for the correct voice portal may be identified (block 530). For example, after determining that the caller-provided BTN is a MTN, voice portal 240 may refer to another directory (or another portion of the same directory) to determine the exchange number for the correct voice portal (e.g., voice portal 245).

A refer message, based on the BTN of interest and the correct voice portal, may be assembled (block 540). For example, voice portal 240 may generate a refer message identifying that the call should be forwarded to voice portal 245. The refer message may be a SIP Refer message that identifies the intended destination for the call.

Figure 6:
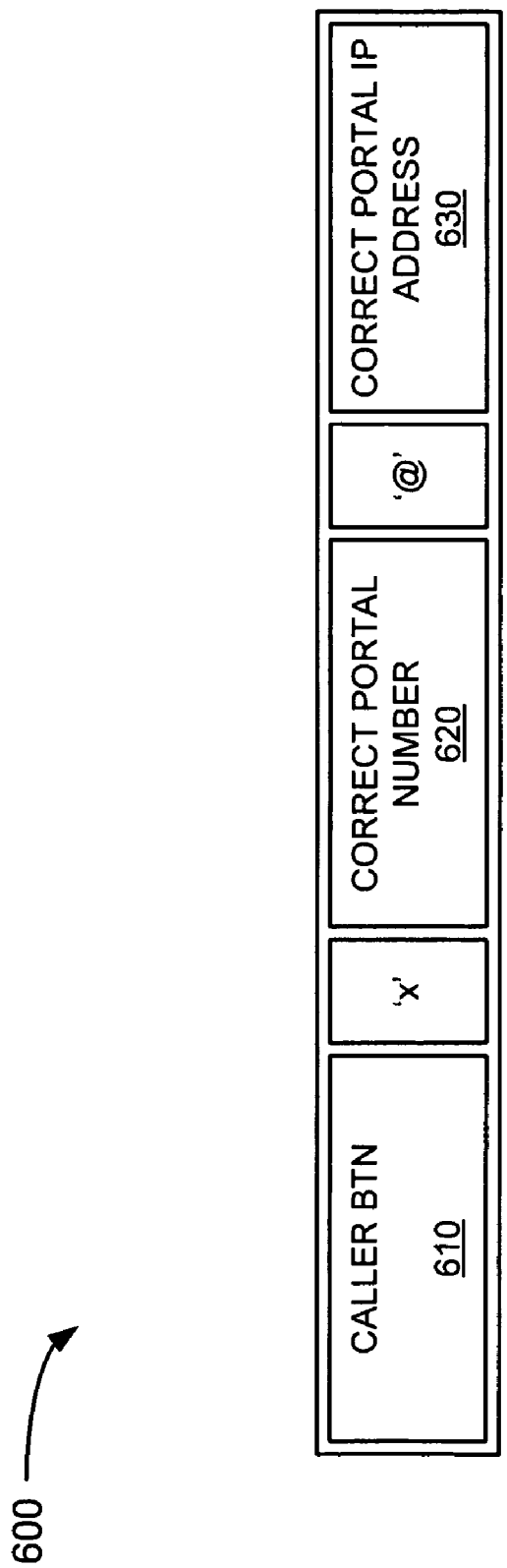
FIG. 6 illustrates an exemplary refer message that may be used in the re-routing instructions depicted in FIG. 4.

FIG. 6 is a block diagram of an exemplary refer message 600 based on a BTN of interest and a correct voice portal. Refer message 600 may include a caller-entered BTN 610, a correct voice portal exchange number 620, and a correct voice portal's IP address 630. Refer message 600 may be assembled as a string of text, and may use characters, e.g., 'x' and '@', to help distinguish blocks of information.

Returning to FIG. 5, the refer message may be forwarded to the network device (block 550). For example, voice portal 240 may forward the refer message to network device 220. Network device 220 may receive the refer message and may determine that the intended destination for the call is an external destination. That is, network device 220 may determine that the destination voice portal 245 is located in a different data center than network device 220.

Returning to FIG. 4, an automatic number identification (ANI) may be modified to match an ANI associated with the caller's intended BTN (block 440). For example, gateway 221 in network device 220 may modify an automatic number identification (ANI) to match an ANI associated with the caller's intended BTN using the caller-entered BTN.

The call may be transferred to the correct voice portal (block 450). For example, gateway 221 may transfer the call over network 260 to network device 225 using the correct voice portal number provided in the refer message (such as refer message 600). A VoIP protocol may be used for this transfer. Further, this transfer may be a two B-channel transfer (TBCT), and network 260 may include one or more PSTNs. By altering the ANI to the caller-entered BTN, a PSTN switch may consider the caller-entered BTN to be the transfer ANI. The transfer may be accomplished without using third party transfer mechanisms to convey data, including the caller BTN.

The caller may be connected to the correct voice portal (block 460). For example, network device 225 may receive the call and determine that the call is intended for voice portal 245. The call may be connected between the caller at user device 210 and IVR 246 at voice portal 245. The caller at user device 210 may proceed to interact with IVR unit 246 at voice portal 245. The IVR unit 246 may provide to the caller what appears as the caller's number, which may be the modified ANI, and may ask the caller whether this is the BTN of interest. The caller may respond affirmatively and may avoid having to reenter the BTN.

In this manner, a call may be re-routed outside a data center (e.g., the call may exit the data center and may be re-routed via an external network, such as the PSTN) without requiring a caller to re-enter a particular BTN of interest. That is, a call that is more appropriately handled at a voice portal other than the voice portal at which the call is initially received may be re-routed outside a calling center using, for example, a VoIP transfer that does not require third party transfer mechanisms. Such third party transfer mechanisms may include, for example, software or hardware that would translate the call data when it switches to a different network environment. This may save considerable infrastructure costs, call processing time, and may improve the automated service environment for the caller.

Figure 7:
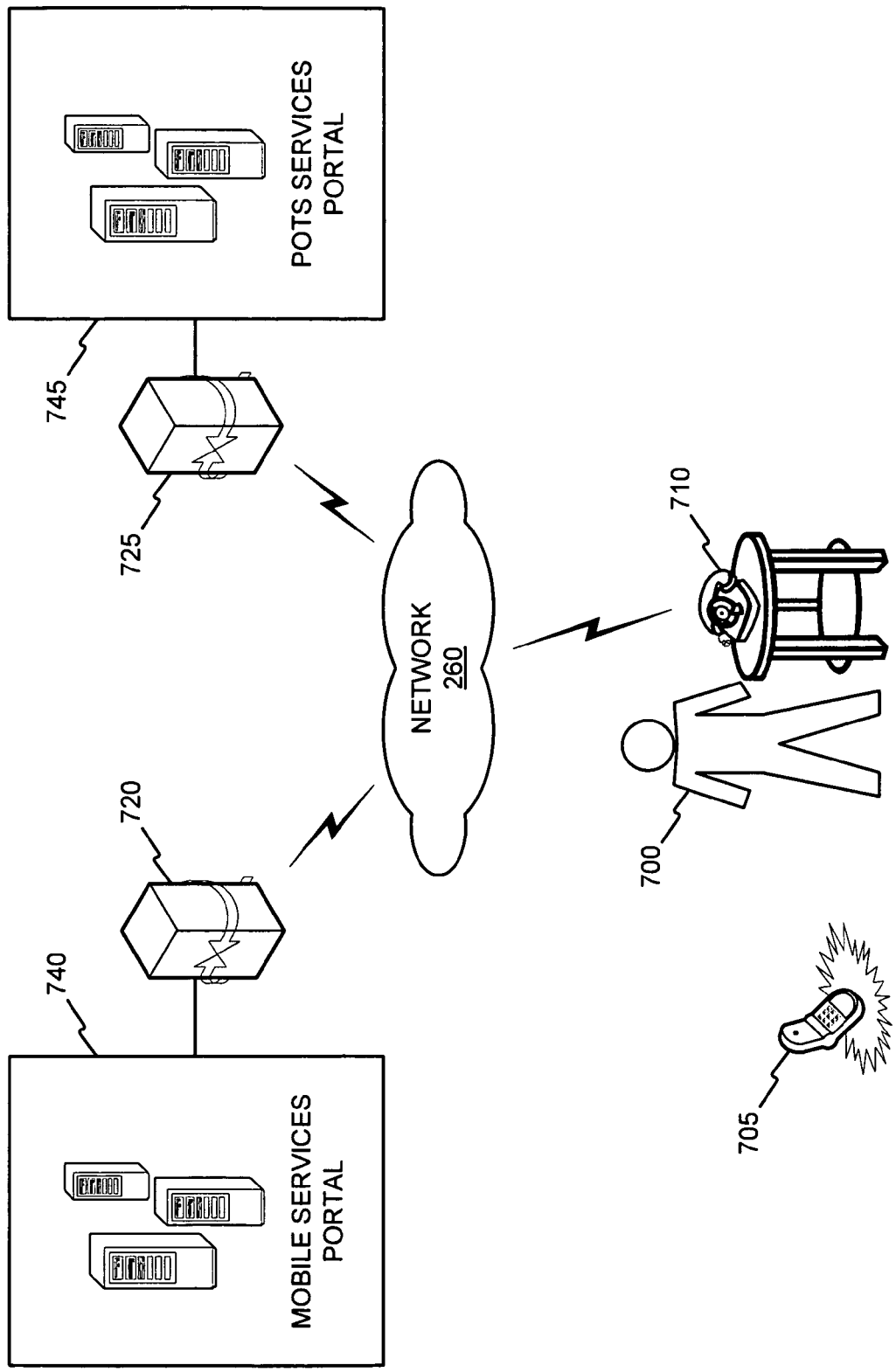
FIG. 7 illustrates an exemplary use of the voice portal to voice portal transfer according to systems and methods described herein.

FIG. 7 provides an example of a caller using an exemplary voice portal transfer system according to implementations described herein. Caller 700 may have, for example, broken his cell phone 705. Caller 700 may use his land-based phone 710 to call his company which provides both his cell and land-based phone services. Caller 700 may call the company's land-based phone service call center and may be connected to a POTS services portal 745. POTS services portal 745 may ask caller 700 whether or not the number he called from (the land-based phone) is the number of interest. Caller 700 may say it is not, and may enter his cell phone number. POTS services portal 745 may look up this BTN and may find that caller 700 should be transferred to the company's mobile services portal 740. Portal 745 may compose and send to network device 725 a refer message comprising the caller's BTN and a destination of mobile services portal 740. Network device 725 may alter the call to appear to originate from the caller's BTN, and may transfer the call through network 260 to network device 720. Network device 720 may connect caller 700 to mobile services portal 740. Mobile services portal 740 may ask caller 700 whether the number in the ANI (i.e., the caller's intended BTN that was identified to network device 720 in the refer message) is the BTN of interest. Since it is, caller 700 does not have to enter his BTN again. Caller 700 may then be assisted appropriately.

Implementations described herein provide for transferring calls among voice portals. In addition, caller data may be provided along with a call using various IP-based signaling. This may permit efficient handling of calls in a data center environment.

The foregoing description of exemplary implementations provides illustration and description, but is not intended to be exhaustive or to limit the invention to the precise form disclosed. Modifications and variations are possible in light of the above teachings or may be acquired from practice of the invention.

For example, various features have been described above with respect to using SIP signaling. As discussed above, other signaling protocols, such as H.323 or other IP-based signaling/protocols may be used in other implementations. In addition, in some implementations, the functions described above as being performed by one of the components may be performed by other components. In other implementations, the functions described as being performed by multiple components may be performed by a single component. For example, in some implementations, the functions described as being performed by gateway 221 (and/or SBC 222) and SIP proxy 230 may be performed by a single device. In addition, in some implementations, a SIP proxy may not be required. For example, in some implementations, a soft switch may be used instead of SIP proxy 230. In still other implementations, a combination of SIP proxies and soft switches may be used to process and forward telephone calls.

In other instances, if the first voice portal that receives the call (e.g., voice portal 240) determines that it is not the appropriate voice portal to handle the call, but cannot identify the proper voice portal, the first voice portal may transfer the call to gateway 221 (or SBC 222, network device 220 or SIP proxy 230) with the caller BTN obtained during interaction with the caller. In this case, gateway 221 (or SBC 222 or network device 220) and/or SIP proxy 230 may use some or all of the obtained caller data received from the first voice portal (e.g., voice portal 240 in this example) to identify another voice portal (e.g., voice portal 245) that is the appropriate voice portal to handle the call.

In addition, while series of blocks have been described with respect to FIGS. 4 and 5, the order of the blocks may be varied in other implementations. Moreover, non-dependent blocks may be implemented in parallel.

It will be apparent that various features described above may be implemented in many different forms of software, firmware, and hardware in the implementations illustrated in the figures. The actual software code or specialized control hardware used to implement the various features is not limiting of the invention. Thus, the operation and behavior of the aspects of the invention were described without reference to the specific software code—it being understood that one would be able to design software and control hardware to implement the various features based on the description herein.

Further, certain portions of the invention may be implemented as "logic" that performs one or more functions. This logic may include firmware, hardware, such as a processor, a microprocessor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, at a voice portal, a telephone call from a caller;
   identifying a first billing telephone number associated with an automatic number identification associated with the telephone call;
   acquiring, from the caller, a second billing telephone number;
   determining that the first billing telephone number is different than the second billing telephone number;
   determining, based on the second billing telephone number, to transfer the telephone call to a specific call center;
   identifying an exchange number for the specific call center;
   assembling a refer message based on the second billing telephone number and the exchange number of the specific call center;
   sending the refer message to a network device;
   changing the automatic number identification to the second billing telephone number based on determining that the first billing telephone number is different than the second billing telephone number; and
   transferring the telephone call to the specific call center based on changing the automatic number identification.

2. The method of claim 1, where determining to transfer the telephone call to the specific call center comprises:
   retrieving information about the second billing telephone number from a cross-portal directory associated with the specific call center.

3. The method of claim 1, where determining to transfer the telephone call to the specific call center comprises:
   retrieving information about the second billing telephone number from a cross-portal directory accessible to more than one voice portal through a network.

4. The method of claim 1, where acquiring the second billing telephone number comprises:
   providing the first billing telephone number to the caller; and
   obtaining, via an interactive voice response unit, the second billing telephone number in response to providing the first billing telephone number.

5. The method of claim 1, further comprising:
   transferring the telephone call to the specific call center using a two b-channel transfer protocol (TBCT).

6. The method of claim 1, further comprising:
   transferring the telephone call to the specific call center using a network comprising one or more public switch telephone networks (PSTNs).

7. A system comprising:
   a voice portal to:
      receive a telephone call from a caller, the telephone call including an automatic number identification,
      identify a first billing telephone number associated with the automatic number identification,
      request a second billing telephone number from the caller,
      receive the second billing telephone number from the caller,
      determine that the first billing telephone number is different from the second billing telephone number received from the caller,
      identify a separate voice portal for the second billing telephone number based on determining that the first billing telephone number is different from the second billing telephone number,
      assemble a refer message to indicate an exchange number of the separate voice portal and the second billing telephone number,
      change the automatic number identification to the second billing telephone number based on determining that the first billing telephone number is different than the second billing telephone number, and
      transfer the telephone call from the voice portal to the separate voice portal based on changing the automatic number identification.

8. The system of claim 7, where the voice portal is further to:
   send the refer message to a network device to initiate the transfer of the telephone call from the voice portal to the separate voice portal, and
   where changing the automatic number identification causes the transferred telephone call to appear to originate from the second billing telephone number.

9. The system of claim 7, where the voice portal further comprises:
   a memory to store a cross-portal directory of billing telephone numbers, and
   where the separate voice portal is identified based on the cross-portal directory.

10. The system of claim 7, further comprising:
    a cross-portal directory of billing telephone numbers that is accessible to more than one voice portal through a network, and
    where, when identifying the separate voice portal, the voice portal is to:
       determine that the second billing telephone number comprises a mobile telephone number, and
       identify the separate voice portal further based on determining that the second billing telephone number comprises the mobile telephone number.

11. The system of claim 7, where the refer message complies with two b-channel transfer protocol (TBCT).

12. A non-transitory memory device comprising instructions, the instructions comprising:
    one or more instructions, which, when executed by a processor, cause the processor to receive a telephone call that includes an automatic number identification;
    one or more instructions, which, when executed by the processor, cause the processor to identify a first billing telephone number associated with the automatic number identification;
    one or more instructions, which, when executed by the processor, cause the processor to request, through an interactive voice response unit, a second billing telephone number;
    one or more instructions, which, when executed by the processor, cause the processor to receive the second billing telephone number;
    one or more instructions, which, when executed by the processor, cause the processor to determine that the first billing telephone number is different than the second billing telephone number;
    one or more instructions, which, when executed by the processor, cause the processor to determine, based on the second billing telephone number, to transfer the telephone call to a call center;
    one or more instructions, which, when executed by the processor, cause the processor to identify an exchange number associated with the call center;
    one or more instructions, which, when executed by the processor, cause the processor to assembly a refer message based on the second billing telephone number and the exchange number of the call center;
    one or more instructions, which, when executed by the processor cause the processor to change the automatic number identification to the second billing telephone number based on determining that the first billing telephone number is different from the second billing telephone number; and one or more instructions, which, when executed by the processor, cause the processor to transfer the telephone call to the call center based on changing the automatic number identification.

13. The memory device of claim 12, further comprising:
one or more instructions to send the refer message to a network device.

14. The memory device of claim 13, where the one or more instructions to send the refer message include:
one or more instructions to use of a two b-channel transfer protocol (TBCT), when sending the refer message to the network device.

15. The memory device of claim 12, where the one or more instructions to identify the first billing telephone number include:
one or more instructions to retrieve information identifying the first billing telephone number from a cross-portal directory.

16. A system, comprising:
means for identifying a first billing telephone number associated with an automatic number identification of a received telephone call;

means for acquiring from a caller a second billing telephone number;

means for determining that the second billing telephone number is different from the first billing telephone number;

means for determining, based on the second billing telephone number, that a telephone call should be transferred;

means for identifying an exchange number to transfer the telephone call based on the second billing telephone number;

means for assembling a refer message that includes the second billing telephone number and the exchange number;

means for changing the automatic number identification to the second telephone billing number based on determining that the second billing telephone number is different from the first billing telephone number; and means for transferring the telephone call based on changing the automatic number identification.

17. The system of claim 16, further comprising:
means for initiating the transfer of the telephone call to cause a transfer recipient to receive the second billing telephone number as an automatic number identification of the transferred call.

* * * * *